United States Patent

Sandström et al.

[11] Patent Number: 6,167,177
[45] Date of Patent: Dec. 26, 2000

[54] OPTICAL FIBER CABLE

[75] Inventors: Ulf Sandström, Styrsö; Sven-Olov Roos, Lerum; Per-Arne Torstensson, Kungsbacka, all of Sweden

[73] Assignee: Permanova Lasersystem, Ostersund, Sweden

[21] Appl. No.: 09/214,102

[22] PCT Filed: Jul. 1, 1997

[86] PCT No.: PCT/SE97/01202

§ 371 Date: Mar. 29, 1999

§ 102(e) Date: Mar. 29, 1999

[87] PCT Pub. No.: WO98/01784

PCT Pub. Date: Jan. 15, 1998

[30] Foreign Application Priority Data

Jul. 5, 1996 [SE] Sweden .................. 9602666

[51] Int. Cl.[7] .................. G02B 6/44; G02B 6/00
[52] U.S. Cl. .................. 385/100; 385/134; 385/33; 385/902
[58] Field of Search .................. 385/100, 134, 385/33, 902; 219/121.6

[56] References Cited

U.S. PATENT DOCUMENTS

| | | | |
|---|---|---|---|
| 4,575,181 | 3/1986 | Ishikawa | 350/96.2 |
| 4,678,273 | 7/1987 | Vilhelmsson | 350/96.3 |
| 4,707,073 | 11/1987 | Kocher | 350/96.23 |
| 5,619,602 | 4/1997 | Sandstrom et al. | 385/31 |

FOREIGN PATENT DOCUMENTS

| | | |
|---|---|---|
| 0 725 291 A1 | 2/1996 | European Pat. Off. |
| 0 457 284 B1 | 8/1996 | European Pat. Off. |
| 0 723 169 A1 | 12/1996 | European Pat. Off. |
| 2 152 163 | 5/1973 | Germany |
| 4305313 C1 | 3/1994 | Germany |
| 2031420 | 3/1995 | Russian Federation |
| 2 147 208A | 8/1984 | United Kingdom |
| 2 147 209A | 8/1984 | United Kingdom |

*Primary Examiner*—Frank G. Font
*Assistant Examiner*—Roy M. Punnoose
*Attorney, Agent, or Firm*—Pollock, Vande, Sande & Amernick

[57] ABSTRACT

An optical fiber cable of the type comprising a fiber (3) having a central core and a surrounding cladding and made for transmitting optical high-power, specifically power exceeding 1 kW. At least one of the fiber ends is provided with cooling means for optical power loss comprising a cavity with a flowing coolant (2) surrounding the envelope surface of the fiber end. Incident radiation that falls outside the fiber comes into the coolant, preferably a liquid coolant such as water, where it is at least partially absorbed. At least one of the limiting wall surfaces of the cavity is completely or partially non-absorbing for the incident radiation, while the other limiting wall surfaces are arranged to absorb such radiaton that is still present and transmitted through the flowing coolant (2). As these surfaces are in direct contact with the coolant an efficient cooling is obtained.

7 Claims, 3 Drawing Sheets

OPTICAL FIBER CABLE

BACKGROUND OF THE INVENTION

The present invention relates to an optical fiber cable which comprises a fiber having a central core and a surrounding cladding and which fiber cable is made for transmitting high optical power, specifically power exceeding 1 kW. At least one of the contact ends of the fiber has cooling means for optical power loss.

Optical fiber cables for transmitting high optical power are frequently used in industrial applications. Specifically they are used in cutting and welding operations by means of high-power laser radiation, but also in other industrial applications such as heating, detection or working operations in high-temperature environments this type of optical fiber cables can be used. One of the main problems in this type of high power applications, however, is the problem how to take care of radiation that falls outside the core of the fiber. The power density is normally very high and specific cooling means are required in order to prevent an uncontrolled heating, especially in case of strong back scattering in for instance welding operations.

Different methods to take care of such undesired power radiation are already known. One example is disclosed in DE 4305313, in which the radiation that falls into the cladding of the fiber is spread in a so-called mode stripper and absorbed by a metal surface. This surface can then be cooled from the outside of the component. A similar method is described in SE 83.07140-7.

An optical fiber cable of the above-mentioned type is also presented in SE 93.01100-5. In said fiber cable at least one of the end surfaces of the fiber core is provided with a rod having a larger diameter than the core diameter. At this end the fiber is provided with a reflector designed to conduct rays entering outside the fiber towards an area where they can be absorbed without causing any damage. In the illustrated embodiment this area is surrounded by a heat-abducting device with cooling fins, but it is also mentioned that water cooling means may be included in this area for cooling off the generated heat. Also in this case the cooling is provided from the outside of the component.

A weakness in all of these methods that now have been described is the fact that the heat first must be absorbed by a metal surface and then conducted through the metal material to the cooled surface either this surface is cooled by means of air or by water.

SUMMARY OF THE INVENTION

The object of this invention is to provide an optical fiber cable with an improved cooling capability so that the fiber can be used for transmitting a very high optical power without causing any damage to the fiber itself or to the housing. The invention is based upon the fact that the power (heat) is absorbed directly in a cooling medium instead of being conducted through a metal material.

According to the invention at least one of the contact ends of the fiber, comprising the core and the surrounding cladding, are located in a cavity filled with a flowing coolant so that radiation falling outside the fiber is entered into and absorbed at least partially by the coolant. The walls of the cavity comprises at least one non-absorbing surface. The other wall surfaces could be absorbing (metal). Radiation passing through the coolant is absorbed by said surfaces. As these surfaces are directly cooled by the flowing medium (liquid coolant) any uncontrolled heating can be avoided. As the optical radiation is passing through the flowing coolant before reaching the metallic surface, only a minor part of the radiation is absorbed by the surface.

According to a preferred embodiment the fiber is directly in contact with the surrounding coolant, for example water.

According to an alternative embodiment the fiber is surrounded by a transparent tube which then is directly in contact with the surrounding coolant.

In the following the invention will be described more in detail with reference to the accompanying drawings which schematically illustrates some examples of the new optical fiber cable.

DETAILED DESCRIPTION OF THE INVENTION

Figure 1:
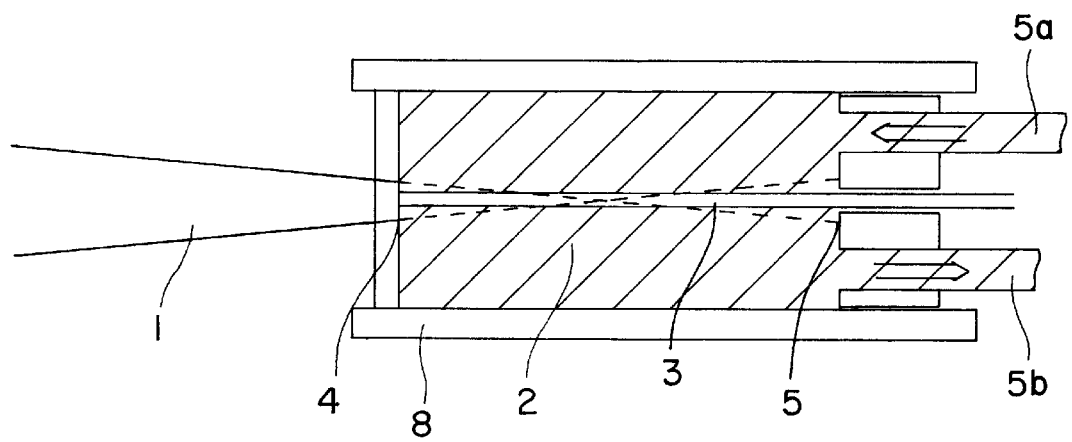
FIG. 1 shows the principles for an optical fiber cable with direct water cooling means of the contact end of the cable.

FIG. 1 illustrates one end of a conventional optical fiber 3 having a core, for example of quartz glass, and a cladding, for example made of glass or some polymer having a suitable refractive index.

A laser beam 1 is focused on the end surface of the fiber. Preferably a Nd-YAG laser source is used which has a wave-length of 1.06 $\mu$m. This wave-length is suitable for optical fiber transmission. Other examples of lasers that can be used is diode lasers, $CO_2$-lasers, CO-lasers and other types of Nd-lasers.

A liquid coolant 2 is surrounding the envelope surface of the end portion of the fiber. That part 4 of the incident laser radiation that falls outside, the core of the fiber is entered into and absorbed, at least partially, by the coolant. Radiation transmitted through the liquid is absorbed by the walls 8,5 enclosing the liquid. These walls are in direct contact with the coolant so that they are cooled directly on the surface. The rear wall 5 has an in put pipe 5a as well as an output pipe 5b for the liquid coolant.

The absorption in the liquid should not be too high due to the risk of shock boiling of the liquid when it is hit by the radiation. Water is a suitable cooling medium, for simplicity, but also for the reason that the deep of penetration is suit able. For a Nd-YAG laser, for example, the deep of penetration is approximately 50 mm.

The surface hit by the incident laser beam must be transparent in order to allow the radiation to pass into the liquid cavity. This surface, the so-called window 7, can either be glass-clear or diffuse, the important thing is that the absorption in this surface is low.

Figure 2:
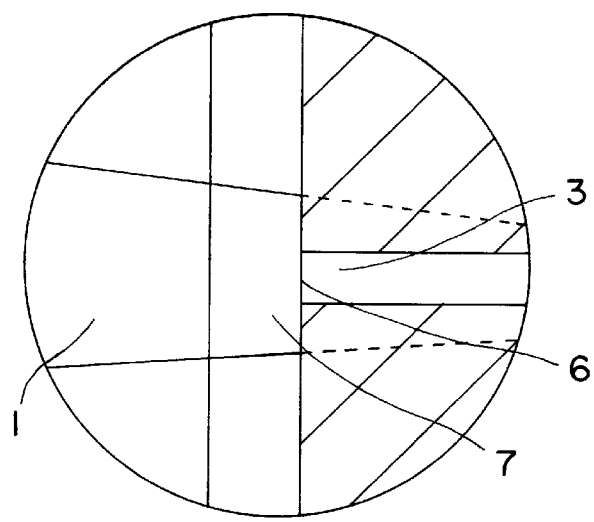
FIG. 2 is a detailed view of the interface zone between the end portion of the fiber and the transparent "window" through which the radiation is entered into the cavity with the liquid coolant surrounding the end portion of the fiber.

According to a preferred embodiment of the invention the end surface 6 of the fiber is in optical contact with the window 7. The optical window then must have a good optical quality as also the original radiation is passing through this window. By means of the optical contact between the window and the end surface of the fiber, basically all reflection losses can be eliminated in the interface zone, see FIG. 2. Optical contact can be achieved by means of fusing the fiber and the window together like illustrated in the above-mentioned SE 93.01100-5 for the rod fused together with the end surface of the fiber. The window 7 should be comparatively thick in order to allow an anti-reflex coating on the surface.

Figure 3:
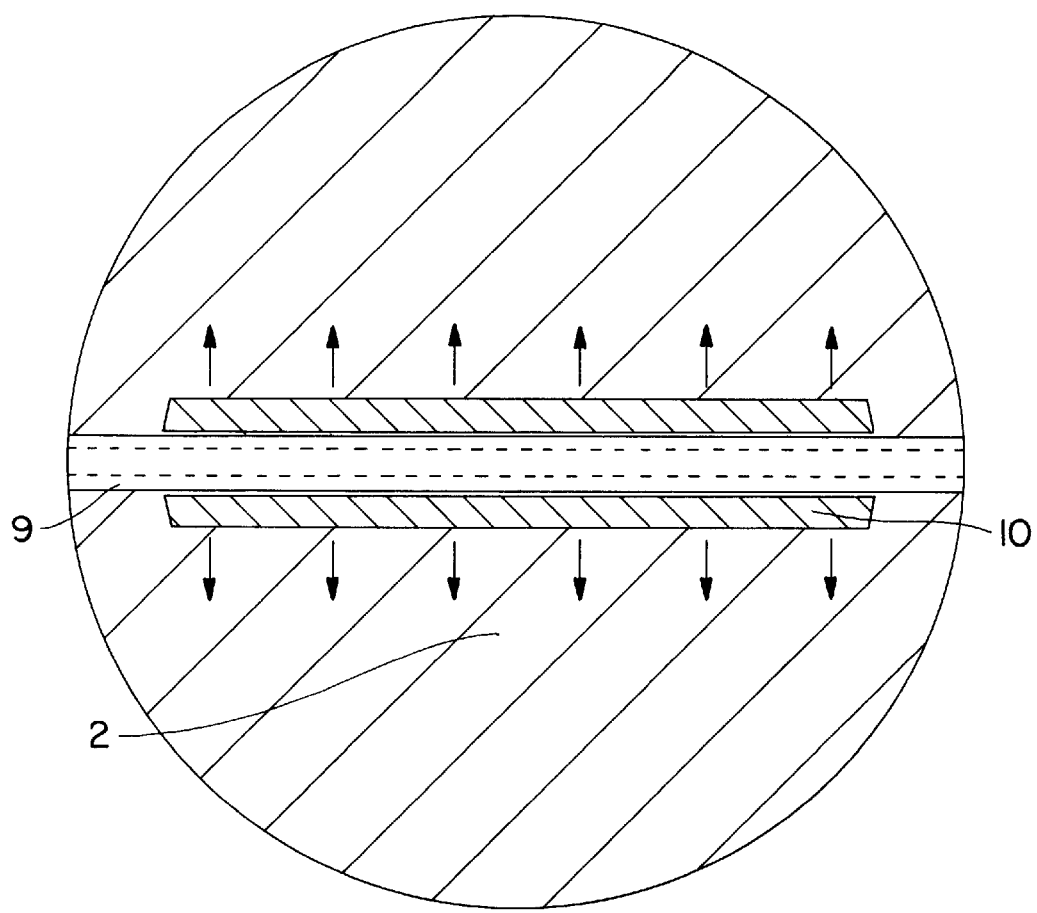
FIG. 3 shows a so-called mode stripper arranged around the fiber in the liquid coolant cavity in order to transmit radiation in the cladding of the fiber out to the surrounding coolant.

In addition to the radiation which falls completely outside the fiber, also such radiation that has passed into the cladding 9 should be directed out into the surrounding coolant. This can be achieved by means of a so-called mode stripper 10 arranged on the fiber as illustrated in FIG. 3. The mode-stripper could be a glass-capillary of the type which has been previously illustrated in SE 83.07140-7 and SE 93.01100-5 and in which the glass-capillary is bonded to the envelope surface of the cladding and thus removing any radiation from the cladding.

Alternatively, the mode-stripping could be achieved by means of a roughening of the envelope surface of the fiber. Such roughening is previously known per se, see U.S. Pat. No. 4,575,181. Due to the roughening, the radiation in the cladding will be directed out from the cladding into the coolant where it is absorbed.

In the embodiment described so far the window and the fiber were fused together in order to obtain a good optical contact. Another way to obtain a good optical contact is to press the fiber and the window against each other. Also in such case the losses in the contact zone are negligible.

Figure 4:
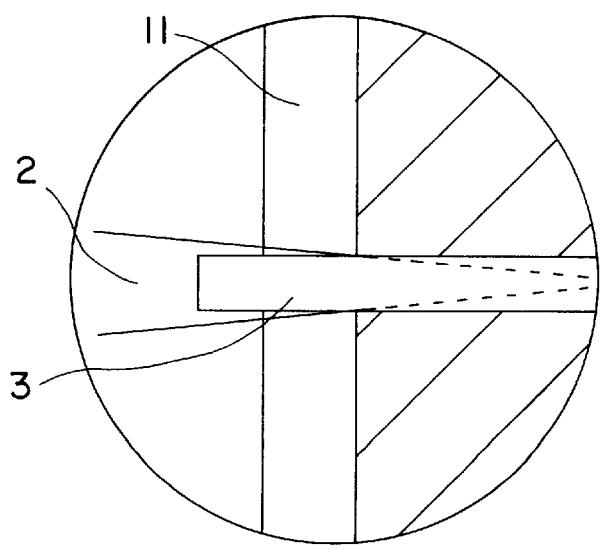
FIG. 4 is a detailed view of the interface zone between the end portion of the fiber and the transparent window according to an alternative embodiment in which the "window" is made as an optical disc with a central bore which disc is sealed against the circumferential surface of the fiber.

Instead of applying the end surface of the fiber against a window 7 an optical disc 11 having a central bore can be used, see FIG. 4. The disc 11 can be made as a transparent, non-absorbing limiting surface (front wall) for the coolant in the same way as the window 7, but with a central opening into which the fiber end has been inserted. The disc is arranged with an appropriate sealing against the envelope surface of the fiber. The disc need not to be of the best optical quality as the major part of the radiation 2 does not pass through the disc but directly into end surface of the fiber. The aperture disc can be either glass-clear or mat finished.

Figure 5A:
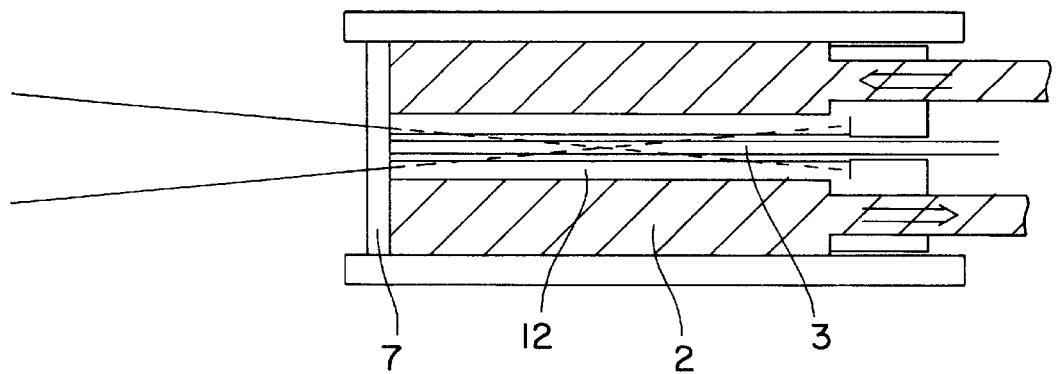
FIGS. 5a–5c shows three examples how to arrange a transparent capillary tube around the fiber in the liquid coolant cavity.
Figure 5B:
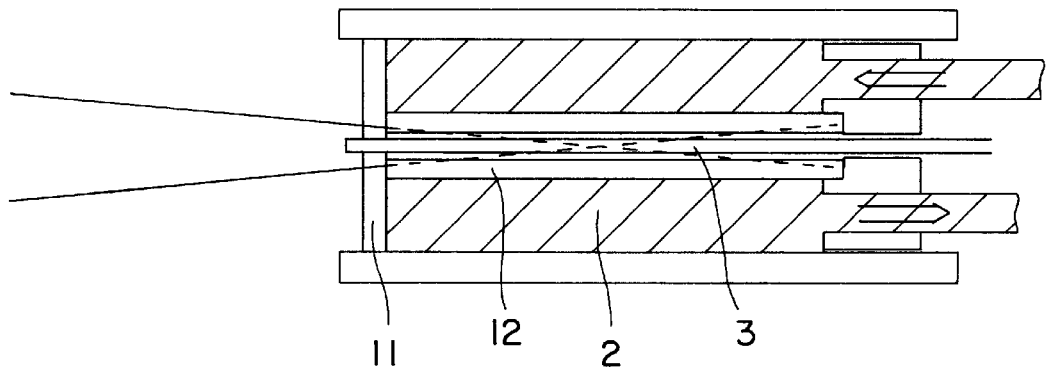
Figure 5C:
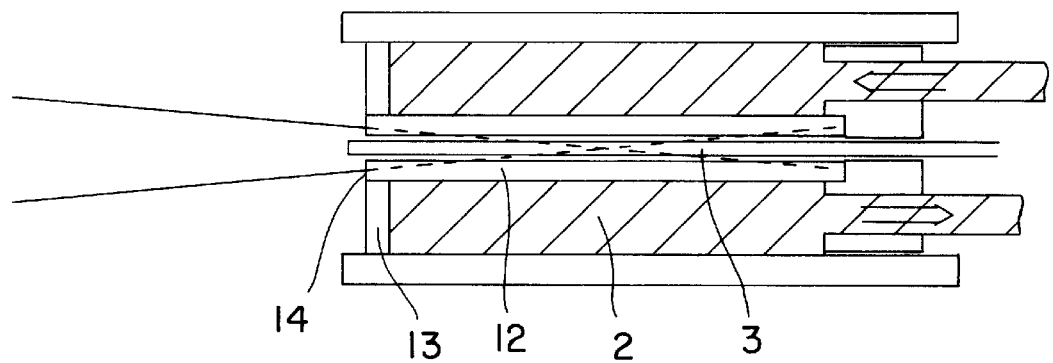

In one of the embodiments the fiber 3 is surrounded by a capillary tube 12 made of a transparent material, for example quartz glass, so that the envelope surface of the capillary tube is in contact with the coolant. In FIG. 5 there are three examples of capillary tube applications. In FIG. 5*a* the capillary tube 12 extends up to and is sealed against the inner surface of the window 7. In the example in FIG. 5*b* the fiber 3 extends through the front window (disc) 11. Even in this case the capillary tube is sealed against the inner surface of the disc 11. In the third example, which is illustrated in FIG. 5*c*, also the capillary tube 12 itself extends through the front wall 13. In this case it is not necessary that the front wall is transparent as the radiation incident outside the end surface 14 of the capillary tube is negligible.

The object of the capillary tube is to provide an extra protecting, non-absorbing casing of the fiber. As already mentioned the capillary tube is sealed against both the front and rear walls of the cavity so that the coolant is closed within the annular spacing formed between the envelope surface of the capillary tube and the cylindrical outer wall of the cavity and will not come into contact with the envelope surface of the fiber itself. Contrary to the glass capillary used as a mode stripper this capillary tube need not be fixed by cement on the fiber. In case a capillary tube is used the mode stripping is made by roughening the surface of the cladding.

The invention is not limited to the illustrated examples but can be varied within the scope of the accompanying claims.

What is claimed is:

1. An optical fiber cable of the type comprising a fiber with a central core and a surrounding cladding said fiber cable being made for transmitting optical high-power, specifically power exceeding 1 kW, and at least one of the fiber ends having cooling means for optical power loss comprising a cavity with a flowing, absorbing coolant surrounding the envelope surface of said fiber end so that incident optical radiation falling outside the fiber comes into and is absorbed at least partially by said coolant and wherein the limiting wall surfaces of the cavity comprise a forward, at least partially non-absorbing surface through which the radiation is entered, while the limiting wall surfaces are arranged to be directly cooled by said flowing coolant to avoid any uncontrolled heating of said surfaces due to absorbed radiation and wherein the forward limiting wall surface comprises a transparent window and the end surface of the optical fiber is brought into optical contact with said window.

2. Optical fiber cable according to claim 1 wherein said coolant is a liquid coolant, preferably water.

3. Optical fiber cable according to claim 2 wherein the fiber is in direct contact with the liquid coolant.

4. Optical fiber cable according to claim 2 wherein the fiber is surrounded by a transparent tube which is in direct contact with the liquid coolant.

5. Optical fiber cable according to claim 2 wherein the limiting wall surfaces of the cavity filled with the liquid coolant a substantially cylindrical limiting wall surface extending coaxially in the longitudinal direction of the fiber and a rear, limiting wall surface through which inlet- and outlet pipes are arranged for the liquid coolant.

6. Optical fiber cable according to claim 1 wherein the end surface of the optical fiber is fused together with the window.

7. Optical fiber cable according to claim 1 wherein the end surface of the optical fiber has been pressed against the window for a good optical contact between the window and the fiber.

* * * * *